R. SERBAN.
STEERING MECHANISM FOR AUTOMOBILES.
APPLICATION FILED SEPT. 8, 1915.
1,225,737.
Patented May 8, 1917.
2 SHEETS—SHEET 1.
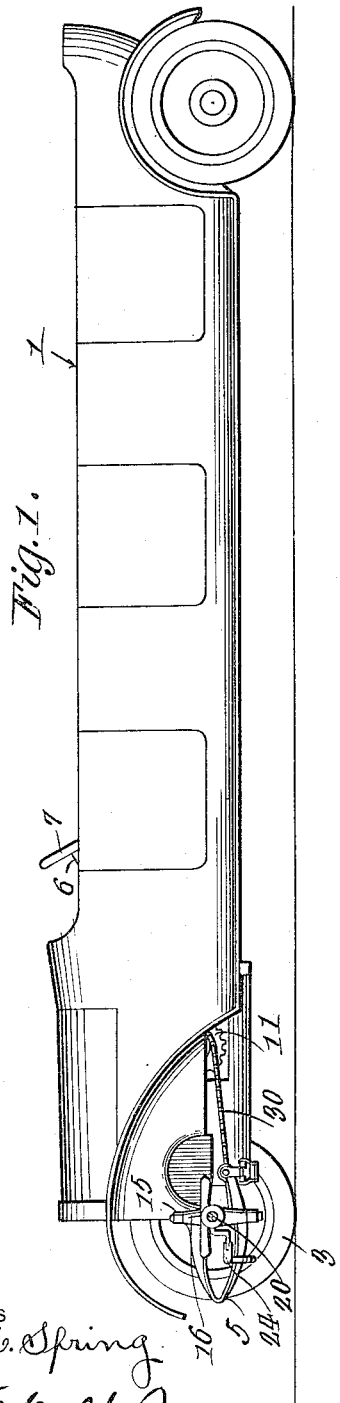
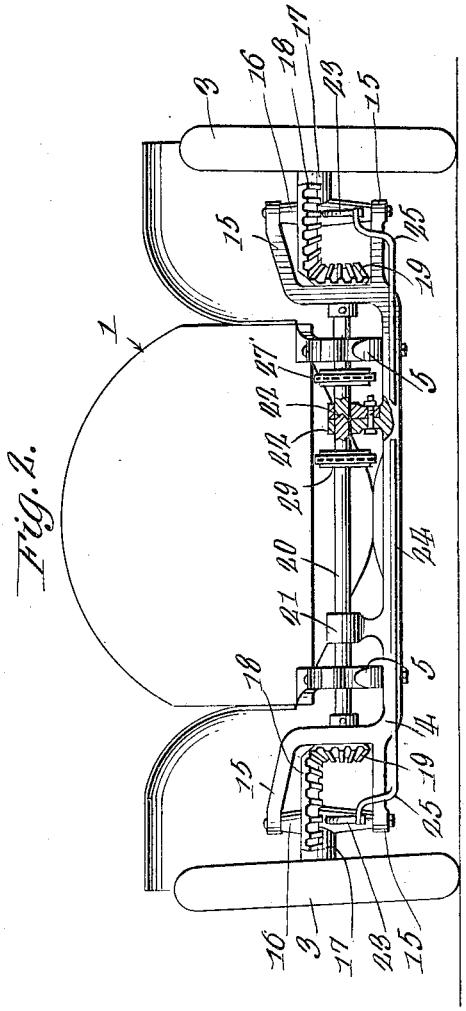
INVENTOR
Remusz Serban
BY Richard B. Owen
ATTORNEY
WITNESSES
Guy M. Spring
W. E. Valk Jr.

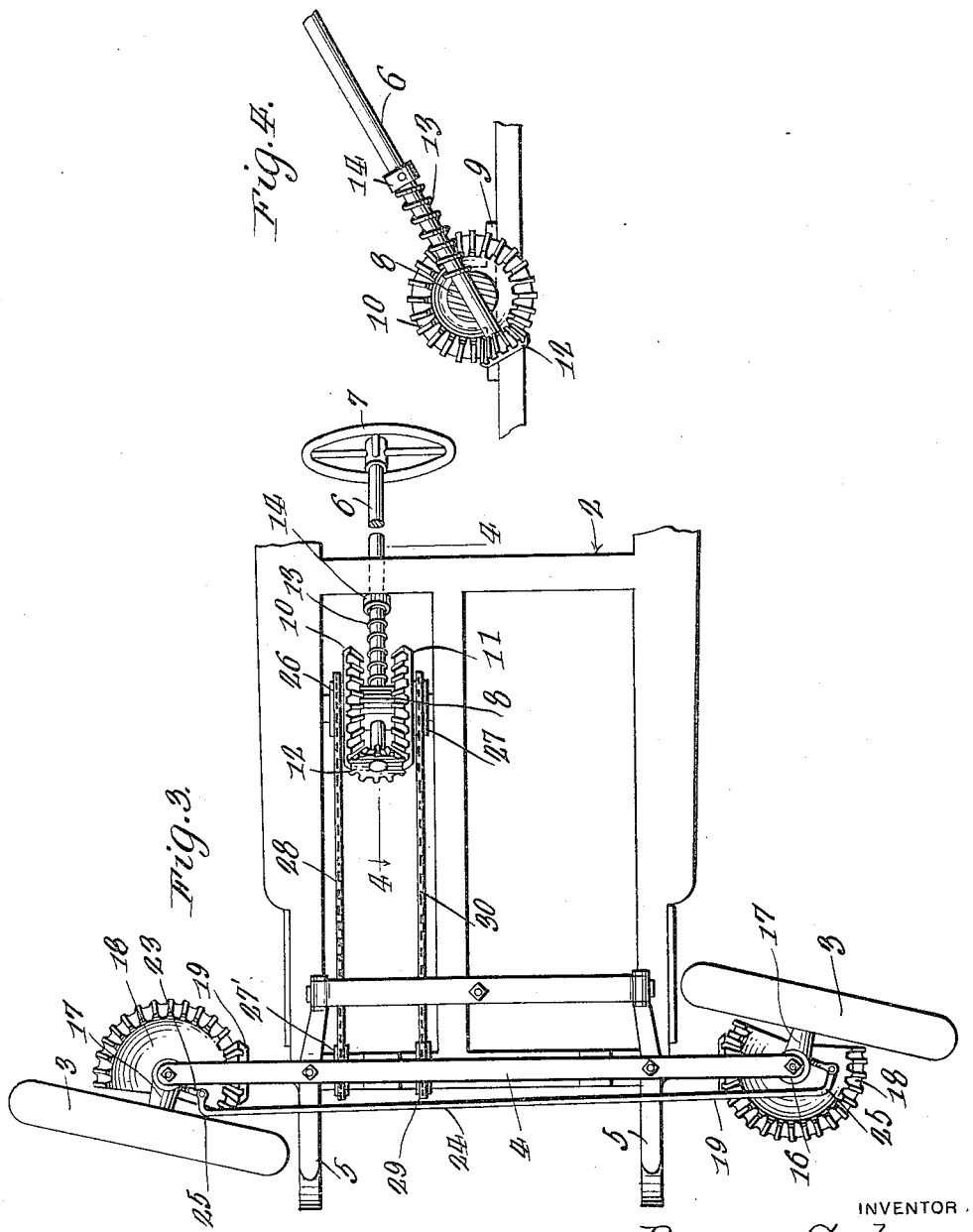

UNITED STATES PATENT OFFICE.

REMUSZ SERBAN, OF SOUTH BETHLEHEM, PENNSYLVANIA.

STEERING MECHANISM FOR AUTOMOBILES.

1,225,737.  Specification of Letters Patent.  Patented May 8, 1917.

Application filed September 8, 1915. Serial No. 49,487.

*To all whom it may concern:*

Be it known that I, REMUSZ SERBAN, subject of the King of Hungary, residing at South Bethlehem, in the county of Northampton and State of Pennsylvania, have invented certain new and useful Improvements in Steering Mechanism for Automobiles, of which the following is a specification.

My invention relates to the steering mechanism of automobiles and contemplates a novel construction, combination and arrangement of parts whereby automobiles of exceptional lengths or extended wheel-base may be turned in a minimum of space.

A further object of the invention is to improve generally in the steering gear arrangement of automobiles and like self-propelled or motor vehicles.

I further contemplate a novel arrangement whereby a fixed shaft is conjunctively utilizable as a bearing for the steering column or post and as a support for duplicate bevel gears mounted in opposed relation to jointly mesh with an operating gear or pinion mounted on said post.

I still further contemplate a divided front axle of a construction permitting relative movement of the axle parts.

The above and additional objects are accomplished by such means as are illustrated in their preferred embodiment in the accompanying drawings, described in the following specification and then more particularly pointed out in the claims which are appended hereto and form a part of this application.

In describing my invention in detail reference will be had to the accompanying drawings wherein like characters denote like or corresponding parts throughout the several views, and in which:—

Figure 1 is a side elevation of an automobile of an extended wheel base, one of the front or steering wheels having been removed;

Fig. 2 is a front elevation of an automobile, parts being shown in section, illustrating the gearing mechanism constituting the device of the invention claimed;

Fig. 3 is a plan view, inverted, of the steering mechanism; and

Fig. 4 is a detail sectional view of the gears and other mechanism mounted at the base of the steering column or post.

Before proceeding with a description of the drawings I desire to call particular attention to the fact that while I have evolved my invention with reference to its use in connection with automobiles, the same, if desired, may be used in connection with traction engines, motor trucks and like self-propelled or motor vehicles.

Referring now to the drawings by numerals, 1 designates as an entirety the body of an automobile of exceptional length or extended wheel base, 2 as an entirety the chassis or frame, 3—3 the front or steering wheel, 4 the front axel, 5—5 the front body supporting frame, 6 the steering column or post and 7 the steering wheel.

The steering column 6 is mounted at its lower end to penetrate a stub shaft 8 journaled in bearings 9 fastened to the chassis 2. Said shaft 8 not only acts as a bearing for the column 6 but also as a support for opposed bevel gears 10 and 11 mounted to turn loosely thereon. A bevel gear or pinion 12 is mounted on the column 6 to engage or mesh with the mentioned gears 10 and 11 that the latter may turn oppositely and in unison through manipulation of the steering wheel 7 in a manner common to the art. A spring 13 is arranged to embrace the column 6 to abut at one end the shaft 8 and at its opposite end a collar 14 on said column that the gear 12 may be at all times maintained in engagement with the gears 10 and 11. Collar 14 is adjustable longitudinally of the column 6 to vary the tension of said spring.

Yokes 15 are formed upon the terminals of the axle 4 to mount the steering knuckles 16 in the manner desired. Each steering knuckle 16 is provided with a spindle 17 that the front or steering wheels 3 may be mounted to turn thereon.

A segmental bevel gear structure 18 is mounted on each of the steering knuckles 16 to mesh with the bevel gears 19 mounted at the terminals of a shaft 20 disposed forwardly of the machine directly above the front axle 4 to be journaled in bearings 21 therefor integral with said axle. Said shaft 20 is transversely divided as indicated at 22 that each of the respective parts or sections thereof may move either independently or in unison. One of the bearings 21 is of a construction whereby the divided shaft 20 may be properly borne.

A steering arm 23 extends forwardly of each steering knuckle 16 that the mentioned knuckles may be connected by means of a rod 24 bent adjacent each end or as indicated at 25 that the steering wheels 3 during a turning movement of the column 7 may assume the position indicated in Fig. 3 of the drawings.

A sprocket 26 is mounted on the stub shaft 8 to turn with the gear 10. A duplicate sprocket 27 is mounted on said shaft to turn with the gear 11. Sprocket 26 is operatively connected to a sprocket 27' mounted on one of the parts or sections 20 through the medium of a sprocket chain 28, while sprocket 27 is connected to a sprocket 29 mounted on the other of the said shaft parts or sections through the medium of a chain 30; this arrangement permitting the shaft sections 20 to be turned in opposite directions upon manipulation of the steering wheel 7 as hereinbefore set forth.

From the foregoing, taken in connection with the accompanying drawings it will be noted that the front or steering wheels 3 may be turned at a sharp angle to the car body through manipulation of the steering wheel 7; that as a result of such movement of the steering wheels the automobile or machine may be turned about in a minimum of space; and that by dividing the shaft as indicated at 22, the respective shaft parts or sections may be oppositely turned through movement of the gears 10 and 11 to which the shaft sections are connected as indicated at 28 and 30.

Having thus fully described my invention, what I claim as new and desire to secure by Letters Patent, is:—

1. A steering mechanism for vehicles including steering wheels, and a steering column, opposed gears at opposite sides of the column loosely mounted on a shaft, said column extending through the shaft, means operable by the gears for turning the wheels, a gear on the column engaging both of the aforesaid gears, the column being movable to disengage its gear from the others and a spring for resisting such disengagement.

2. A steering mechanism for vehicles including the steering wheels, a divided shaft, opposed gears, a shaft on which said gears are mounted, a steering column journaled in said last mentioned shaft, means on the steering column and engaging the opposed gears for turning said gears oppositely and in unison, a connection between the respective opposed gears and the respective shaft sections, and a connection between the respective shaft sections and the steering wheels.

3. A steering mechanism for vehicles including steering wheels, a steering knuckle for each wheel, a gear carried by each steering knuckle, a divided shaft, a gear mounted on each shaft section to engage with the respective first mentioned gears, a steering column, opposed gears mounted one on each side of the mentioned column, a shaft conjunctively utilizable as a support for the opposed gears and as a bearing for said column, a gear mounted on said column to engage with the opposed gears that the latter may be turned oppositely and in unison, and a connection between the respective opposed gears and the respective shaft sections that the latter may be turned oppositely and in unison to swing the wheels at an angle to the vehicle, substantially as described.

4. In a steering mechanism for vehicles, the steering wheels, a steering column, opposed bevel gears mounted one at each side of said column, a shaft conjunctively utilizable as a support for the mentioned gears and as a bearing for said column, a bevel pinion mounted on said column to engage with the opposed gears that the latter may be turned oppositely and in unison, resilient means maintaining said pinion in engagement with the gears, a divided shaft, the respective sections of which have connection with the steering wheels, and a connection between the respective opposed gears and the respective shaft sections.

In testimony whereof I affix my signature in presence of two witnesses.

REMUSZ SERBAN.

Witnesses:
 JOHAN HENGSTENBERGER,
 C. DANIEL FRIEBELY.

Copies of this patent may be obtained for five cents each, by addressing the "Commissioner of Patents, Washington, D. C."